Aug. 23, 1938.     H. L. NORTHUP ET AL     2,127,982
METHOD OF MANUFACTURING OIL SEALS
Filed March 2, 1936     3 Sheets-Sheet 1

Inventors:
Harry L Northup,
Jens Agger,

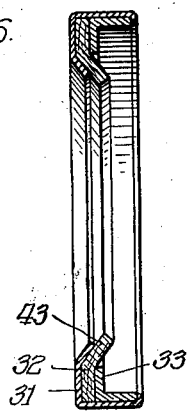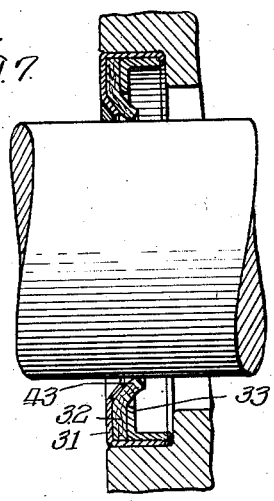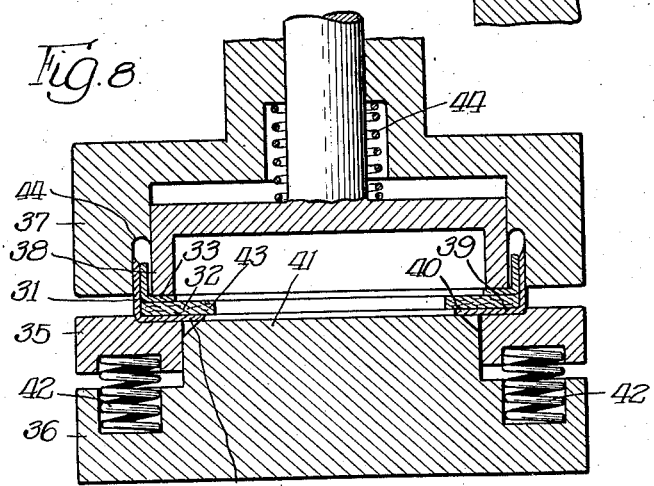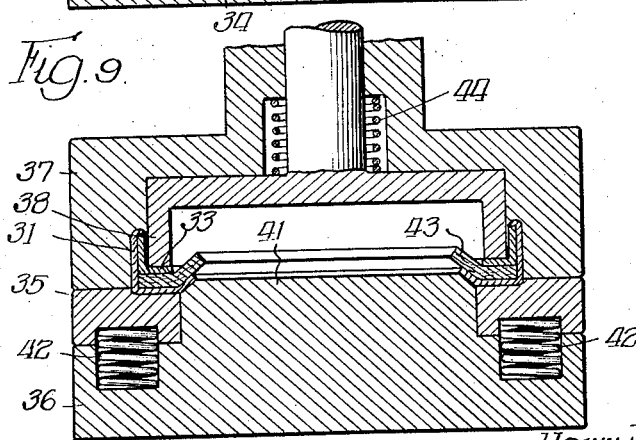

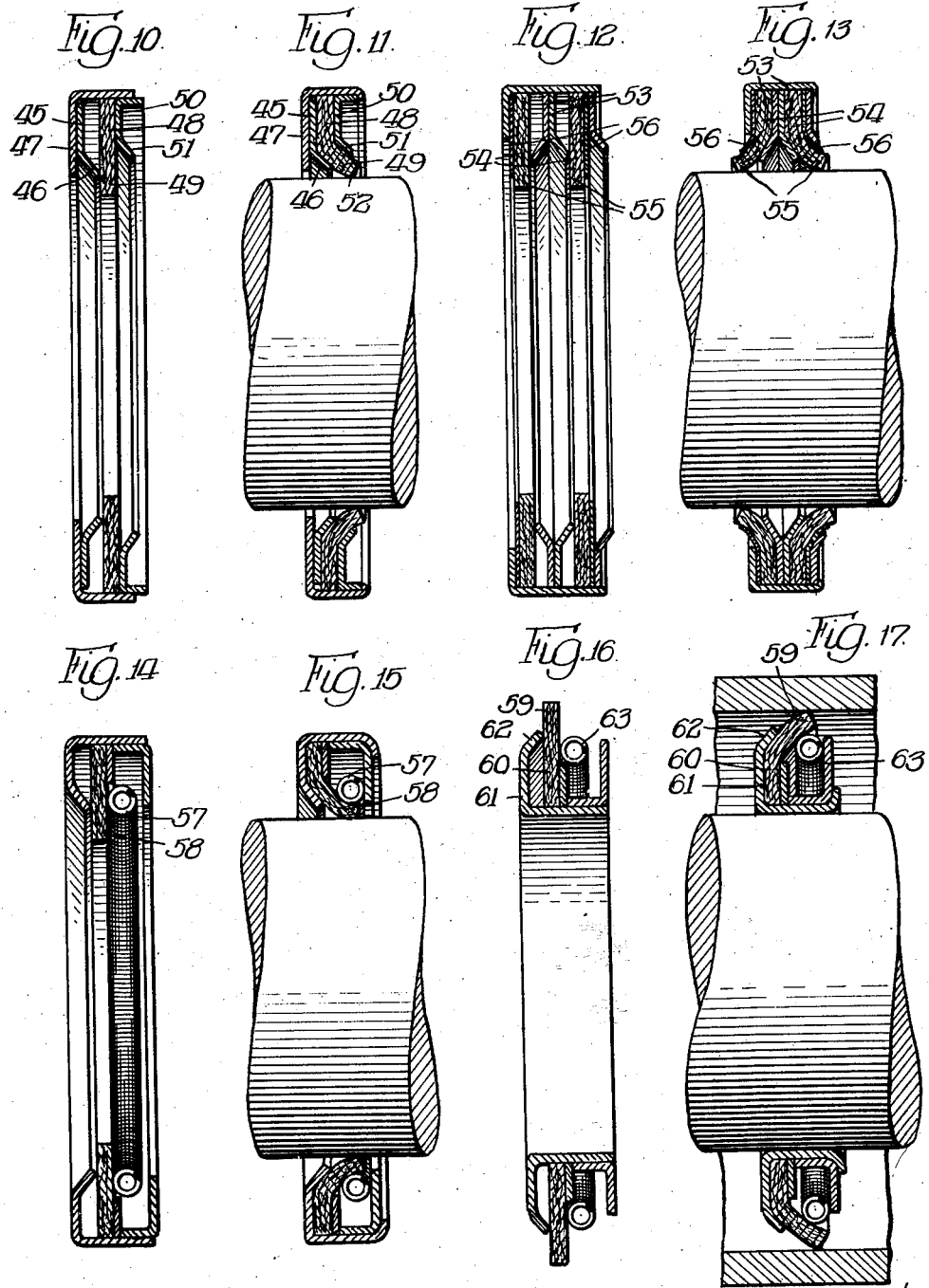

Patented Aug. 23, 1938

2,127,982

UNITED STATES PATENT OFFICE 2,127,982

METHOD OF MANUFACTURING OIL SEALS

Harry L. Northup and Jens Agger, Chicago, Ill., assignors to Chicago Rawhide Manufacturing Company, Chicago, Ill., a corporation of Illinois Application March 2, 1936, Serial No. 66,600

9 Claims. (Cl. 29—148)

The present invention has to do with self-contained oil seals of the type in which the packing element is a centrally apertured disk of leather or other suitable material and the sealing portion of the packing element is of generally conical formation for sleeved association with a rotating shaft or other member to be sealed.

Heretofore in manufacturing oil seals of this type it has been the practice to form up the sealing portion of the packing element between properly shaped dies, assemble the thusly pre-formed packing element with the metal parts of the seal, and thereafter secure all of the parts together under pressure to produce a self-contained sealing unit.

The principal purpose of this invention is to provide an improved method of manufacture, in which the sealing portion of the packing element of the seal is given its conical shape at the time that it is combined with the other parts of the seal.

The new method materially reduces the cost of manufacture of the seal, assures a correct centering of the conical portion of the packing element with respect to the other parts, and results in a permanent support for the conical portion.

Another object of the invention is to provide an improved seal which has the conical sealing portion of the packing element pressed into correct shape by an associated metal part.

While the foregoing statements are indicative in a general way of the nature of the invention, other more specific objects and advantages will be apparent to those skilled in the art upon a full understanding of the new method and the improved seal structure produced in accordance therewith.

Two different ways of practicing the method are presented herein for the purpose of exemplification, but it will of course be appreciated that the method may be modified in various respects without departing from the invention as defined in the appended claims.

In the accompanying drawings:

Fig. 6 is a section through a slightly different seal produced in accordance with the invention;

Fig. 7 is a section through the same seal, showing it applied to a shaft;

Fig. 8 is a section through a set of dies used in producing the last mentioned seal, showing the dies after the seal parts have been placed therebetween but before any pressure has been applied;

Fig. 9 is a similar view, showing the dies fully closed; and

Figs. 10 and 11, 12 and 13, 14 and 15, and 16 and 17 are sections through other seals manufactured in accordance with the invention, Figs. 10, 12, 14 and 16 showing the seals after the parts thereof have been assembled but before they have been pressed together and secured by the action of the dies, and Figs. 11, 13, 15 and 17 showing the same seals completed and in operative association with rotatable members.

Figure 1:
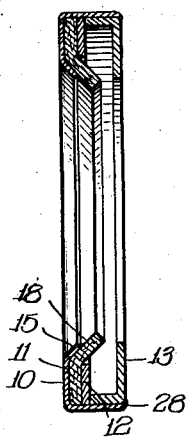
Fig. 1 is a section through a seal produced in accordance with the invention.
Figure 4:
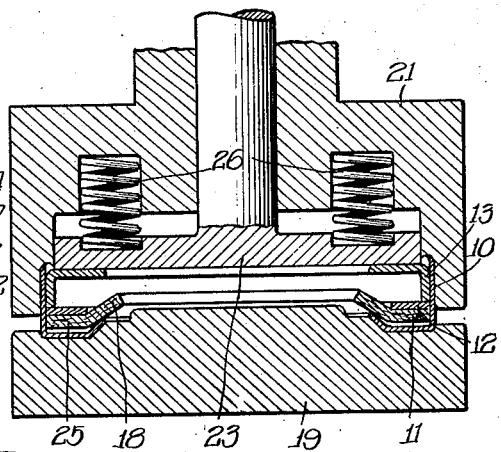
Fig. 4 is a similar view, showing the dies partly closed.
Figure 5:
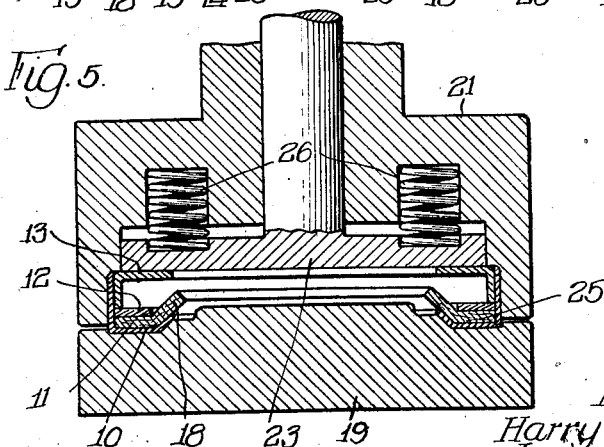
Fig. 5 is a similar view, showing the dies fully closed.

The seal shown in Figs. 1 and 2 and the method of producing the same illustrated in Figs. 3, 4 and 5, will first be described. As will be observed in Fig. 3, the seal before completion consists of a centrally apertured sheet metal cup 10, a flat centrally apertured sheet leather packing element 11, a metal washer 12, and a second centrally apertured sheet metal cup 13. The bottom 14 of the cup 10 is provided about the aperture therein with a conical portion 15 for a purpose which will hereinafter be explained.

Figure 3:
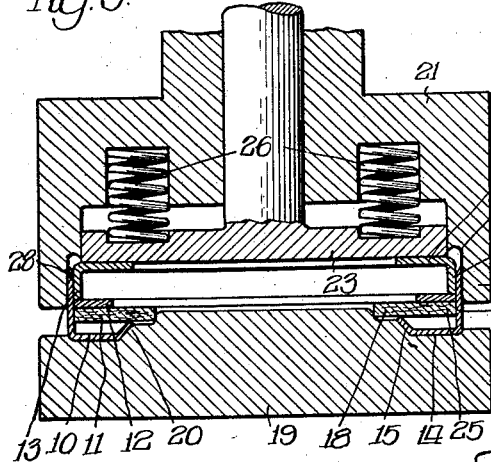
Fig. 3 is a section through a set of dies used in producing the seal, showing the dies after the seal parts have been placed therebetween but before any pressure has been applied.

Before these seal parts are pressed together into a permanently self-contained unit, they are loosely assembled, as shown in Fig. 3, with the flat sheet metal packing element 11 resting on the upturned edge of the conical portion 15 of the bottom of the cup 10, with the washer 12 resting on the top of the packing element 11, and with the second cup 13 inversely nested within the rim 16 of the cup 10 and resting with the lower edge of its rim 17 on the top of the washer 12. It will be noted that at this stage in the manufacture of the device the sealing portion 18 of the packing element 11 is flat and devoid of the conical shaping required in the completed article.

After the parts have been loosely assembled, they are subjected to the action of a set of dies, on the order of those shown in Fig. 3. The cup 10, with the other parts contained therein, is placed on a die 19, which die fits the bottom 14 of the cup and is provided with a conical center portion 20 which extends up into the conical portion 15 of the bottom. A second die 21, in vertical alignment with the first die 19, is then brought down into a position wherein an annular flange 22 on the same surrounds the rim 16 of the cup 10. A third die 23, within the second die 21, is at the same time brought down into engagement with the exposed bottom 24 of the inverted cup 13. As the dies 21 and 23 thereafter continue their downward movement together, the sealing portion 18 of the flat packing element 11 is forced by engagement with the conical portion 15 of the bottom of the cup 10 to assume a conical shape. The positions of the dies 19, 21 and 23 at this stage are shown in Fig. 4.

As soon as the outer portion 25 of the packing element has bottomed tightly against the bottom of the cup 10, in which position the inner sealing portion 18 will have received all of the conical shaping intended for the same, springs 26 between the dies 21 and 23 will yield enough to allow the die 23 to stop and the die 21 to continue its downward movement. This further movement of the die 21 will bring a small fillet 27 on the inside of the die 21 down onto the edge 28 of the rim 16 of the cup 10, which edge is preferably beveled on the inside, and will result in the edge 28 being turned inwardly a short distance over the bottom 24 of the cup 13 into securely locked association with the latter, thereby completing the seal.

After the finished seal has been removed from the dies, the conical portion 15 of the bottom of the outer cup will cause the sealing portion 18 of the packing element to permanently retain the conical shape imparted to it by the action of the closing dies.

Figure 2:
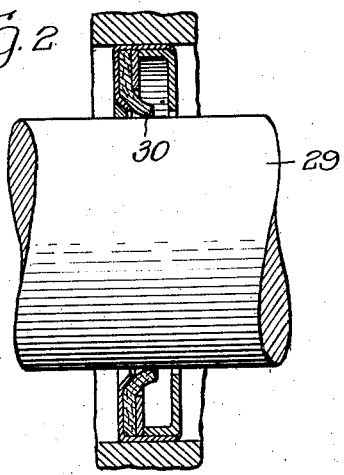
Fig. 2 is a section through the same seal, showing it applied to a shaft.

A seal in which the packing element has been formed up by this method can be easily installed in efficient sealing association with a rotatable shaft 29 or other member, as shown in Fig. 2, the extreme lip 30 of the sealing portion 18 of the packing element being distended by the shaft just enough to produce the desired reacting pressure in the zone of contact. Excellent results can be obtained without the use of any springs or other means for resiliently constricting the lip 30, but if additional constriction is needed to meet some particular problem it is a simple matter to place a coil or finger spring or a ring of rubber-like material or any other sort of resilient means in the assembly against the face of the packing element before the several parts are forced together and permanently joined by the dies.

The sealing method shown in Figs. 6 to 9 inclusive will next be described. The particular seal chosen to illustrate this modified way of practicing the method, is slightly different in construction from the seal shown in Figs. 1 to 5 inclusive, but such differences have no bearing at all on the invention. The seal includes an outer cup 31, a packing element 32, and an inner cup 33. It will be observed that the cup 33 takes the place of both the washer 12 and the inverted cup 13 of the previously described seal. Up to the time that the seal is closed up in the dies the bottom 34 of the cup 31 is flat in the vicinity of the aperture, and when the packing element 32, which is also flat, is placed in the cup 31 preparatory to being acted upon by the dies it will rest flatly upon the bottom of the cup, just as illustrated in Fig. 8. To complete this seal, the parts 31, 32 and 33 are loosely assembled and placed in a press between dies 35, 36, 37 and 38. The cup 31 containing the packing element 32 and cup 33 is positioned with the outer portion 39 of its bottom on the die 35 and with the inner portion 40 of its bottom projecting inwardly over the beveled edge of the die 36. When the dies 37 and 38 are lowered the die 37 will come down about the rim of the cup 31 and the die 38 will come down upon the bottom of the cup 33. When pressure is now applied the dies 35 and 36 will clamp the bottoms of the two cups 31 and 33 tightly against the interposed outer portion of the packing element, and springs 42 between the dies 35 and 36 will yield and allow the projection 41 on the die 36 to move upwardly relative to the die 35. This relative movement will cause the beveled edge of the projection 41 on the die 36 to impart a conical shape to the inner portion 40 of the bottom of the cup 31 and a corresponding conical shape to the overlying inner sealing portion 43 of the packing element. At substantially the same time a spring 44 between the dies 37 and 38 will yield and allow the die 37 to advance beyond the die 38 far enough for a filler 44 on the die 37 to turn in the edge of the rim of the cup 31 over the edge of the rim of the cup 33, thereby permanently securing the parts together.

It will be appreciated from the foregoing explanation that the method which constitutes the invention can be practiced in various ways to obtain substantially the same result.

Many different kinds of seals can have the packing elements thereof formed up by this method, but space does not permit the illustration here of more than just a few.

In the seal which is shown in Figs. 10 and 11 a metal disk 45 with a conical inner portion 46 is inserted between the bottom of the outer cup 47 and the flat packing element 48, in which position it serves to impart a conical shape to the sealing portion 49 of the packing element when the parts are forced together and permanently secured in a press. In this seal a closure member 50 with a conical inner portion 51 is positioned against the opposite face of the packing element, where it acts to limit to some extent the degree to which the lip 52 of the packing element will submit to distention by the shaft.

In the seal which is shown in Figs. 12 and 13 two coned metal disks 53 are placed back to back between two packing elements 54, causing the packing elements to sleeve out in opposite directions upon the seal being closed between suitably shaped dies. In this double two-way seal the sealing lips 55 of the packing elements are supported resiliently against distention by finger spring disks 56, which disks are placed in position before the seal is closed.

In the seal which is shown in Figs. 14 and 15 an endless coil spring 57 is inserted before the seal is closed, so that when the sealing portion 58 of the packing element has been given a conical shape it will distend the spring and thereafter keep the latter in position.

The seal which is shown in Figs. 16 and 17 is of the so-called external type, where the outer portion 59 of the packing element, instead of the inner portion 60, is used as the sealing portion. In this seal the sealing portion 59 of the packing element is formed up in the same way, the supporting metal part 61 having a conical portion 62 which imparts a corresponding shape to the sealing portion 59 when the dies are closed. An endless coil spring 63 may be placed against the packing element before the seal is closed, so that the sealing portion 59 when given its conical shape will compress the spring to the extent necessary to render the latter operative as a means for resiliently expanding the sealing portion.

The packing element of a seal produced in accordance with this invention is preferably made of leather, as excellent results have been obtained with leather packing elements formed up in this way, but the packing element may also be made of fiber, or rubber, or in fact of any material or composition which is sufficiently flexible to be formed up either in the closing dies or by a subsequent finishing operation, which last mentioned procedure is also contemplated as a modified way of practicing the method.

We claim:

1. The method of manufacturing a self-contained permanently assembled oil seal, for insertion as a unit within a housing about a shaft, in which seal the packing element is made of flexible sheet material, such as leather, and has a somewhat conical sealing portion, which consists in taking the packing element while the sealing portion thereof is still in an unformed condition, assembling it with the other parts which are to make up the seal, placing the assembled parts in a press, and closing the press to form the sealing portion of the packing element into the desired conical shape and at the same time permanently secure it to the other parts.

2. The method of manufacturing a self-contained permanently assembled oil seal, for insertion as a unit in a housing about a shaft, which seal is composed of a formed packing element and at least one other permanently connected part, which consists in forming up the packing element after it has been assembled with the other part and before it has been applied to the housing and shaft which it is adapted to seal.

3. The method of manufacturing a self-contained permanently assembled oil seal, for insertion as a unit in a housing about a shaft, which seal is composed of a formed packing element and at least one other permanently connected part, which consists in securing the parts permanently together under pressure in a press and in forming up the packing element at the time it is being connected with the other part.

4. The method of manufacturing a self-contained permanently assembled oil seal, for insertion as a unit in a housing about a shaft, which seal is composed of a formed packing element and at least one other permanently connected part, which consists in forming up the packing element at the time it is being connected with the other part, and utilizing said other part to thereafter maintain the packing element in its formed condition.

5. The method of manufacturing a self-contained permanently assembled oil seal, for insertion as a unit in a housing about a shaft, which seal is composed of a formed packing element and at least one other permanently connected part, which consists in forming up the packing element at the time it is being connected with the other part, and utilizing said other part both to impart the desired shape to the packing element and to thereafter maintain the packing element in that shape.

6. The method of manufacturing a self-contained permanently assembled oil seal, for insertion as a unit within a housing about a shaft, in which seal the packing element is made of flexible sheet material, such as leather, and has a somewhat conical sealing portion, which consists in taking the plain packing element which has no conical sealing portion, placing it against another seal part which is provided with a conical portion, and pressing the two together into permanent association to cause the last mentioned seal part to impart a conical shape to the sealing portion of the packing element and thereafter maintain the sealing portion in such shape.

7. The method of manufacturing a self-contained permanently assembled oil seal, for insertion as a unit within a housing about a shaft, in which seal the packing element is made of flexible sheet material, such as leather, and has a somewhat conical sealing portion, which consists in taking a flat packing element, placing it against a backing member provided with a conical portion, and pressing the two parts together to cause the conical portion of the backing member to impart a conical shape to the sealing portion of the packing element.

8. The method of manufacturing a self-contained permanently assembled oil seal, for insertion as a unit within a housing about a shaft, in which seal the packing element is made of flexible sheet material, such as leather, and has a somewhat conical sealing portion, which consists in taking a flat packing element, placing it in a press against a flat backing member, pressing the two parts together, and imparting a conical shape to the sealing portion of the packing element and the corresponding portion of the backing member at the same time, and securing the parts together under pressure.

9. The method of manufacturing a self-contained permanently assembled oil seal, for insertion as a unit in a housing about a shaft, which seal is composed of a formed packing element and at least one other permanently connected part, which consists in securing the parts permanently together under pressure in a press and in forming up the packing element into finished shape at the time it is being connected with the other part.

HARRY L. NORTHUP.
JENS AGGER.